Figure 1:
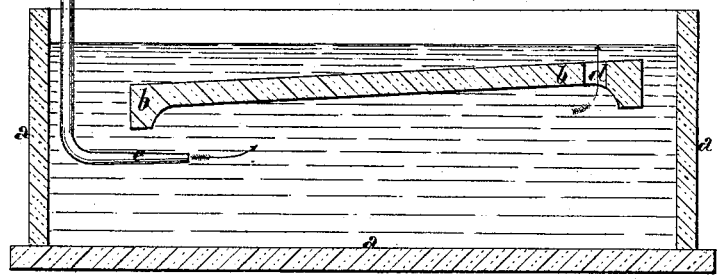

JAMES YOUNG.
Improvement in Treating Petroleum and other Hydrocarbon Oils.
No. 127,446. Patented June 4, 1872.

Inventor.
James Young

UNITED STATES PATENT OFFICE.

JAMES YOUNG, OF KELLY, NORTH BRITAIN.

IMPROVEMENT IN TREATING PETROLEUM AND OTHER HYDROCARBON OILS.

Specification forming part of Letters Patent No. 127,446, dated June 4, 1872.

SPECIFICATION.

I, JAMES YOUNG, of Kelly, in the county of Renfrew, North Britain, have invented certain "Improvements in the Treatment of Hydrocarbon Oils," of which the following is a specification.

The improvements constituting this invention consist in treating hydrocarbons with muriatic acid.

In putting the said invention into practice, the hydrocarbons are agitated with the said acid in suitable vessels, the object being the removal of impurities. The agitation is effected by means of ordinary revolving or reciprocating agitators or dashers, and the vessels are of stoneware or other material which will resist the action of the acid.

The hydrocarbons to which I apply this treatment are those known as natural petroleums, and paraffine oil, otherwise called kerosene and photogene, produced from the distillation of shales, coals, and other such-like substances. These hydrocarbons are subjected to the treatment hereinafter described, either in the crude state or partly refined by distillation, or otherwise partly purified. As some of these hydrocarbons are semi-solid, or imperfectly fluid at the temperature of the atmosphere, it is better to warm them until liquefied before subjecting them to the treatment constituting this invention. Muriatic acid, otherwise known as hydrochloric acid, made in the ordinary or other convenient manner, is passed through a pipe which dips into the liquid hydrocarbons, so that the acid in a gaseous state may mix with them; or if liquid acid is used, the temperature is raised so that the liquid gives off the acid in a gaseous state. The effect of passing the acid into the impure hydrocarbons is to combine the acid with impurities contained in them, which being thus separated are precipitated. The admission of muriatic or hydrochloric acid is continued until the point of saturation of the oil therewith is reached, which point is ascertained by the acid ceasing to be absorbed, this being detected by the acid-gas escaping through the hydrocarbons. In place of using either gaseous or liquid muriatic acid separately, the acid both in the gaseous and liquid states may be used jointly, in which case it is preferable to admit the acid in the two states through separate pipes dipping into the hydrocarbons. After the hydrocarbons have been treated by muriatic acid, either in the gaseous or liquid state, or by gaseous and liquid muriatic acid jointly, they are allowed to settle, and the liquid hydrocarbons may be drawn off from the compound which has been formed by the muriatic acid. The liquid hydrocarbons in this state are washed by agitating them with water, after which it will be found that the greater part of the impurities are removed, and if required the hydrocarbons may be distilled or otherwise treated, such other treatment forming no part of my present invention. In place of mixing the muriatic acid with the hydrocarbons by passing it through a pipe dipping into them, as hereinbefore described, it may be mixed therewith in any other suitable manner. It is preferred to keep the hydrocarbons in a state of agitation during the time that the admission of muriatic acid is continued. This may be effected by numerous mechanical contrivances, none of which form any part of this invention.

Figure 2:
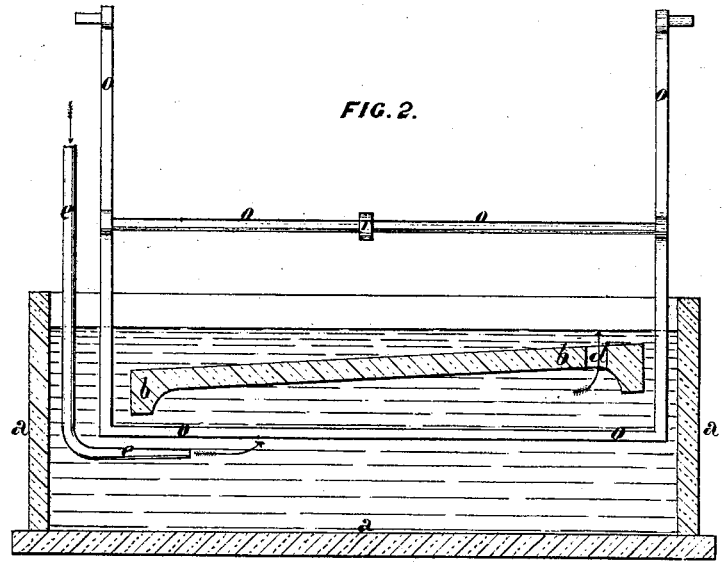
Figure 5:
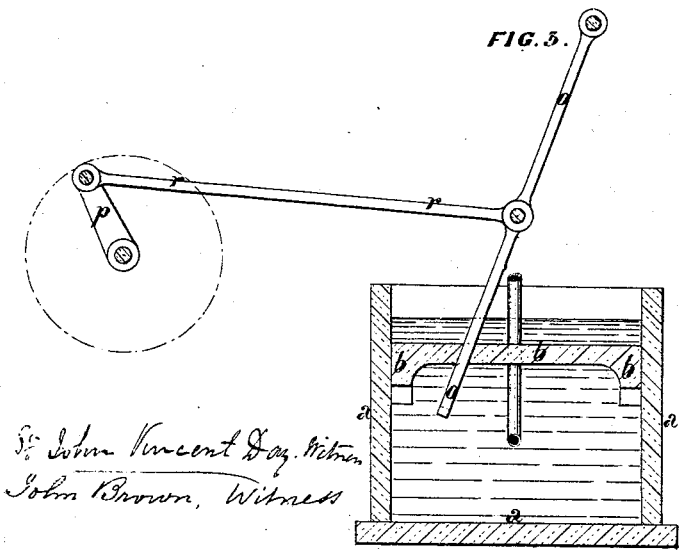

One apparatus which I have used, and find to effect the purpose, is illustrated on the annexed drawing. It consists of a cistern, $a$, of stone, in which an inclined diaphragm, $b$, is situated. The acid passes in below the inclined diaphragm $b$ by the pipe $e$, and, having acted upon the hydrocarbons beneath the diaphragm, the unabsorbed portion escap through the opening $d$ at its highest end. The agitator consists of a suspended frame of wood, $o$, the cross-bar of which is situated below the diaphragm, as shown at Fig. 2, and it is vibrated by a crank and connecting-rod, $p$ and $r$, respectively, as shown at Fig. 3. The hydrocarbons may be treated by the muriatic acid, as hereinbefore described, either one or more times in their course of being refined.

Claim.

The treatment of the hereinbefore-mentioned hydrocarbons with muriatic or hydrochloric acid, substantially as hereinbefore described.

In witness whereof I have signed my name to this specification in the presence of two subscribing witnesses.

JAMES YOUNG.

Witnesses:
ST. JOHN VINCENT DAY,
JOHN BROWN.